US010382967B2

(12) United States Patent
Ben Henda et al.

(10) Patent No.: US 10,382,967 B2
(45) Date of Patent: Aug. 13, 2019

(54) LOCATION INFORMATION PROTECTION

(71) Applicant: Telefonaktiebolaget LM Ericsson (publ), Stockholm (SE)

(72) Inventors: Noamen Ben Henda, Stockholm (SE); Vesa Lehtovirta, Espoo (FI); Prajwol Kumar Nakarmi, Sollentuna (SE); Vesa Torvinen, Sauvo (FI); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/306,062

(22) PCT Filed: Nov. 24, 2016

(86) PCT No.: PCT/EP2016/078656
§ 371 (c)(1),
(2) Date: Nov. 30, 2018

(87) PCT Pub. No.: WO2017/207075
PCT Pub. Date: Dec. 7, 2017

(65) Prior Publication Data

US 2019/0166500 A1 May 30, 2019

Related U.S. Application Data

(60) Provisional application No. 62/345,513, filed on Jun. 3, 2016.

(51) Int. Cl.
*H04W 12/10* (2009.01)
*H04W 4/02* (2018.01)
(Continued)

(52) U.S. Cl.
CPC ....... *H04W 12/1004* (2019.01); *H04L 63/123* (2013.01); *H04L 67/16* (2013.01);
(Continued)

(58) Field of Classification Search
CPC . H04W 12/1004; H04W 4/029; H04W 4/023; H04W 8/005; H04L 63/123; H04L 67/16
See application file for complete search history.

(56) References Cited

U.S. PATENT DOCUMENTS 8,069,483 B1 * 11/2011 Matlock ................ H04W 12/12 713/154
8,714,458 B2 * 5/2014 Musmeci ............. G01S 5/0027 235/492

(Continued)

OTHER PUBLICATIONS

3rd Generation Partnership Project, "3rd Generation Partnership Project; Technical Specification Group Services and System Aspects; Proximity-based services (ProSe); Stage 2 (Release 13)", Technical Specification, 3GPP TS 23.303 V13.2.0, Dec. 1, 2015, pp. 1-122, 3GPP, France.

(Continued)

*Primary Examiner* — Mehmood B. Khan
(74) *Attorney, Agent, or Firm* — Coats & Bennett, PLLC

(57) ABSTRACT

A terminal device obtains location information relating to its location, wherein the location information comprises first location information and second location information, wherein the first location information relates to a location of the terminal device within a region, and wherein the second location information identifies the region in which the terminal device is located. The terminal device forms content for a proximity service discovery message, wherein the content for the discovery message includes the first location information; calculates a message integrity code based on the content for the discovery message and the second location information; and transmits the proximity service discovery message, comprising the content for the discovery message and the computed message integrity code.

26 Claims, 14 Drawing Sheets

RECEIVE PROXIMITY SERVICE DISCOVERY MESSAGE CONTAINING LOCATION INFORMATION OF SENDING DEVICE, WHEREIN LOCATION INFORMATION OF SENDING DEVICE RELATES TO LOCATION OF THE SENDING TERMINAL DEVICE WITHIN SENDING DEVICE REGION — 902

OBTAIN LOCATION INFORMATION RELATING TO LOCATION OF TERMINAL DEVICE, WHEREIN LOCATION INFORMATION COMPRISES FIRST LOCATION INFORMATION AND SECOND LOCATION INFORMATION — 904

DETERMINE SENDING DEVICE REGION FROM OBTAINED LOCATION INFORMATION, AND LOCATION INFORMATION OF THE SENDING DEVICE — 906

CALCULATE MESSAGE INTEGRITY CODE BASED ON CONTENT OF DISCOVERY MESSAGE AND INFORMATION IDENTIFYING SENDING DEVICE REGION — 908

ACT ON PROXIMITY SERVICE DISCOVERY MESSAGE ONLY IF CALCULATED MESSAGE INTEGRITY CODE MATCHES MESSAGE INTEGRITY CODE IN DISCOVERY MESSAGE — 910

(51) Int. Cl.
*H04L 29/06* (2006.01)
*H04W 8/00* (2009.01)
*H04W 4/029* (2018.01)
*H04L 29/08* (2006.01)

(52) U.S. Cl.
CPC .......... *H04W 4/023* (2013.01); *H04W 4/029* (2018.02); *H04W 8/005* (2013.01)

(56) References Cited

U.S. PATENT DOCUMENTS

| | | | | |
|---|---|---|---|---|
| 10,057,755 | B2 * | 8/2018 | Bienas | H04W 48/08 |
| 10,085,299 | B2 * | 9/2018 | Luft | H04W 36/22 |
| 2014/0198719 | A1 * | 7/2014 | Vanderveen | H04L 67/16 370/328 |
| 2016/0088586 | A1 * | 3/2016 | Stephens | H04W 4/06 455/412.2 |
| 2017/0150326 | A1 * | 5/2017 | Hampel | H04W 4/06 |
| 2017/0337394 | A1 * | 11/2017 | Wang | H04L 67/16 |
| 2017/0374549 | A1 * | 12/2017 | Anil | H04W 8/00 |
| 2018/0063706 | A1 * | 3/2018 | Nolan | H04W 8/005 |
| 2018/0176727 | A1 * | 6/2018 | Williams | A61B 5/00 |

OTHER PUBLICATIONS

3rd Generation Partnership Project, "3rd Generation Partnership Project; Technical Specification Group Services and System Aspects; Service requirements for the Evolved Packet System (EPS) (Release 13)", Technical Specification, 3GPP TS 22.278 V13.2.0, Dec. 1, 2014, pp. 1-46, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Technical Specification, 3GPP TS 36.300 V13.2.0, Dec. 1, 2015, pp. 1-290, 3GPP, France.

Ericsson, "Spatial Replay Protection Mechanisms for ProSe Discovery", 3GPP TSG-SA WG3 Meeting #82, Dubrovnik, Croatia, Feb. 1, 2016, pp. 1-6, S3-160179, 3GPP.

3rd Generation Partnership Project, "3rd Generation Partnership Project; Technical Specification Group Services and System Aspects; Proximity-based services (ProSe); Stage 2 (Release 13)", Technical specification, 3GPP TS 23.303 V13.0.0, Jun. 1, 2015, pp. 1-97, 3GPP, France.

3rd Generation Partnership Project, "3rd Generation Partnership Project; Technical Specification Group Services and System Aspects; Study on extended architecture support for proximity-based services (Release 13)", Technical Report, 3GPP TR 23.713 V13.0.0, Sep. 1, 2015, pp. 1-80, 3GPP, France.

3rd Generation Partnership Project, "3rd Generation Partnership Project; Technical Specification Group Services and System Aspects; Study on Security issues to support Proximity Services (ProSe) (Release 13)", Technical Report, 3GPP TR 33.833 V1.7.0, Feb. 1, 2016, pp. 1-237, 3GPP, France.

3rd Generation Partnership Project, "3rd Generation Partnership Project; Technical Specification Group Services and System Aspects; Service requirements for the Evolved Packet System (EPS) (Release 13)", Technical Specification, 3GPP TS 22.278 V13.0.0, Jun. 1, 2014, pp. 1-45, 3GPP, France.

* cited by examiner

LOCATION INFORMATION PROTECTION

TECHNICAL FIELD

This invention relates to methods of operation of a terminal device and a network node in a cellular communications network.

BACKGROUND

Proximity Services (ProSe) are new features of a 3GPP communications network, providing services for ProSe-enabled user equipment devices (UEs) in proximity of each other. These features are standardized in TS 22.278 v13.0.0 and TS 23.303 v13.0.0.

ProSe features consist of ProSe discovery and ProSe direct communication. ProSe discovery identifies ProSe-enabled UEs in proximity of each other. ProSe direct communication enables the establishment of communication paths between ProSe-enabled UEs in direct communication range.

One issue with the current protocol is that it may be possible for an attacker to listen on the air interface at a first location, collect discovery messages broadcast by a first UE, and broadcast the discovery messages from a second location. A second UE, in the vicinity of the second location, can be deceived into believing that it is in the vicinity of the first UE. This has been described as the spatial replay problem.

SUMMARY

According to the present invention there is provided a method. The method comprises: obtaining location information relating to a location of the terminal device, wherein the location information comprises first location information and second location information, wherein the first location information relates to a location of the terminal device within a region, and wherein the second location information identifies the region in which the terminal device is located. The method then comprises forming content for a proximity service discovery message, wherein the content for the discovery message includes the first location information; and calculating a message integrity code based on the content for the discovery message and the second location information. The method then comprises transmitting the proximity service discovery message, comprising the content for the discovery message and the computed message integrity code.

According to the present invention there is provided a terminal device for use in a cellular communications network. The terminal device is configured to operate in accordance with the previous method.

According to the present invention there is provided a terminal device for use in a cellular communications network. The terminal device comprises a processor and a memory. The memory contains instructions executable by the processor, such that the terminal device is operable to: obtain location information relating to a location of the terminal device, wherein the location information comprises first location information and second location information, wherein the first location information relates to a location of the terminal device within a region, and wherein the second location information identifies the region in which the terminal device is located; form content for a proximity service discovery message, wherein the content for the discovery message includes the first location information; calculate a message integrity code based on the content for the discovery message and the second location information; and transmit the proximity service discovery message, comprising the content for the discovery message and the computed message integrity code.

According to the present invention there is provided a terminal device for use in a communications network. The terminal device comprises: an information module for obtaining location information relating to a location of the terminal device, wherein the location information comprises first location information and second location information, wherein the first location information relates to a location of the terminal device within a region, and wherein the second location information identifies the region in which the terminal device is located; a forming module for forming content for a proximity service discovery message, wherein the content for the discovery message includes the first location information; a calculation module for calculating a message integrity code based on the content for the discovery message and the second location information; and a transmitting module for transmitting the proximity service discovery message, comprising the content for the discovery message and the computed message integrity code.

According to the present invention there is provided a method of operation of a terminal device. The method comprises: receiving a proximity service discovery message containing location information of a sending device, wherein the location information of the sending device relates to a location of the sending terminal device within a sending device region; obtaining location information relating to a location of the terminal device, wherein the location information comprises first location information and second location information, wherein the first location information relates to a location of the terminal device within a region, and wherein the second location information identifies the region in which the terminal device is located; determining the sending device region from the obtained location information, and the location information of the sending device; calculating a message integrity code based on content of the discovery message and information identifying the sending device region; and acting on the proximity service discovery message only if the calculated message integrity code matches a message integrity code in the discovery message.

According to the present invention, there is provided a terminal device for use in a communications network, the device being configured to operate in accordance with the previous method.

According to the present invention, there is provided a terminal device for use in a communications network, the device comprising a processor and a memory, the memory containing instructions executable by the processor, such that the terminal device is operable to: receive a proximity service discovery message containing location information of a sending device, wherein the location information of the sending device relates to a location of the sending terminal device within a sending device region; obtain location information relating to a location of the terminal device, wherein the location information comprises first location information and second location information, wherein the first location information relates to a location of the terminal device within a region, and wherein the second location information identifies the region in which the terminal device is located; determine the sending device region from the obtained location information, and the location information of the sending device; calculate a message integrity code based on content of the discovery message and information identifying the sending device region; and act on the proximity service discovery message only if the calculated message integrity code matches a message integrity code in the discovery message.

According to the present invention, there is provided a terminal device for use in a communications network comprising: a receiving module for receiving a proximity service discovery message containing location information of a sending device, wherein the location information of the sending device relates to a location of the sending terminal device within a sending device region; an information module for obtaining location information relating to a location of the terminal device, wherein the location information comprises first location information and second location information, wherein the first location information relates to a location of the terminal device within a region, and wherein the second location information identifies the region in which the terminal device is located; a determination module for determining the sending device region from the obtained location information, and the location information of the sending device; a calculation module for calculating a message integrity code based on content of the discovery message and information identifying the sending device region; and a matching module for acting on the proximity service discovery message only if the calculated message integrity code matches a message integrity code in the discovery message.

According to the present invention there is provided a method of operation of a network node in a cellular communications network, the method comprising: receiving a request for proximity service resources from a terminal device such as a UE; and sending a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

According to the present invention, there is provided a network node for use in a communications network, the network node being configured to operate in accordance with the previous method.

According to the present invention, there is provided a network node for use in a communications network, the network node comprising a processor and a memory, the memory containing instructions executable by the processor, such that the terminal device is operable to: receive a request for proximity service resources from a terminal device such as a UE; and send a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

According to the present invention, there is provided a network node for use in a communications network comprising: a receiving module for receiving a request for proximity service resources from a terminal device such as a UE; and a transmitting module for sending a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

According to the present invention there is provided a computer program configured, when run on a computer, to carry out any of the previous methods. According to the present invention there is provided a computer program product comprises a computer readable medium and such a computer program.

Thus, embodiments of the invention provide protection against the spatial replay attack, without requiring large amounts of additional data to be transmitted, and without incurring significant performance overhead in the devices.

DETAILED DESCRIPTION

Figure 1:
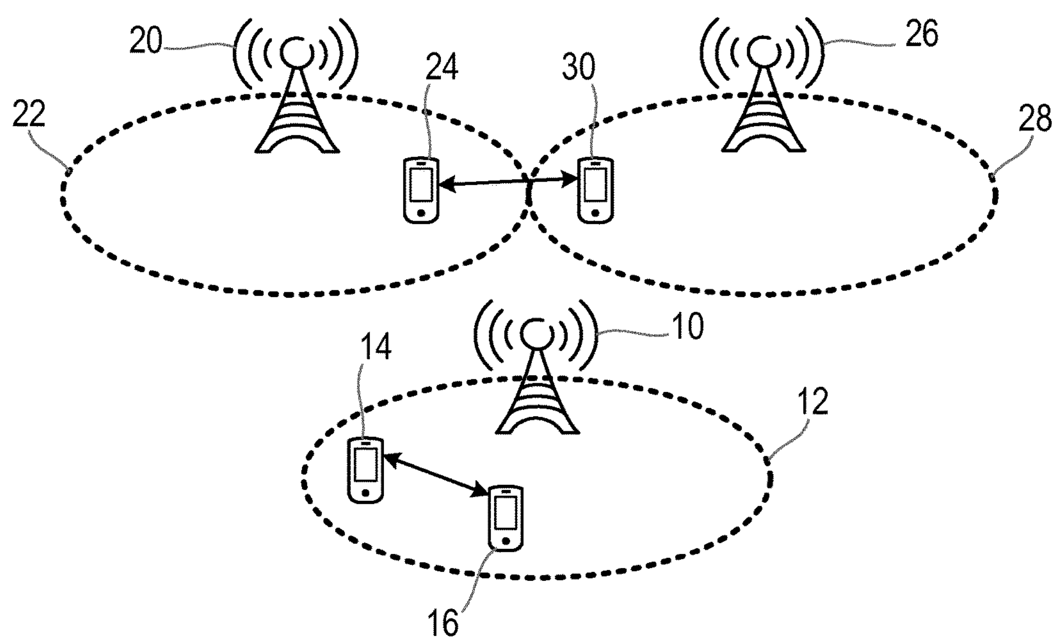
FIG. 1 illustrates a part of a cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

FIG. 1 illustrates a part of a cellular communications network, including a first base station 10, serving a cell 12, with a first wireless communications device (or UE) 14 and a second wireless communications device (or UE) 16 within the cell 12.

The cellular communications network shown in FIG. 1 also includes a second base station 20, serving a second cell 22, with a third wireless communications device (or UE) 24 within the cell 22, and a third base station 26, serving a third cell 28, with a fourth wireless communications device (or UE) 30 within the cell 28.

Each of the base stations 10, 20, 26 has a connection to a core network (not shown in FIG. 1) of the cellular communications network, as described in more detail below.

In the examples described herein, the devices taking part in the methods are described as user equipment devices (UEs). It will be understood that this term is used to refer to user-operated portable communications devices, such as smartphones, laptop computers or the like, to other portable devices, such as tracking devices or the like, and to devices that are primarily intended to remain stationary in use, such as sensors, smart meters or the like.

In the example shown in FIG. 1, the network forms part of an Evolved UMTS Terrestrial Radio Access Network (E-UTRAN), as defined by the 3$^{rd}$ Generation Partnership Project (3GPP). The 3GPP system provides the possibility of Proximity Services (ProSe) that can be used by User Equipment (UE) devices that are in proximity to each other. The ProSe system is described in 3GPP TS 22.278 v13.0.0 and 3GPP TS 23.303 v13.0.0. For example, the ProSe system allows the possibility of Device-to-Device (D2D) communication, without passing messages through the Radio Access Network.

One aspect of the ProSe system is the process of ProSe Discovery. The ProSe Discovery process identifies that ProSe-enabled UEs are in proximity of each other, using Evolved UMTS Terrestrial Radio Access (with or without using the E-UTRAN) or the Extended Packet Core (EPC) network, when permission, authorization and proximity criteria are fulfilled. The proximity criteria can be configured by the operator. One specific form of ProSe Discovery is ProSe Direct Discovery, which is a procedure employed by a ProSe-enabled UE to discover other ProSe-enabled UEs in its vicinity by using only the capabilities of the two UEs with E-UTRA technology.

The term ProSe-enabled UE refers to a UE that supports ProSe requirements and associated procedures. A ProSe-enabled UE may be either a non-Public Safety UE and/or a Public Safety UE.

FIG. 1 shows scenarios for D2D ProSe where two UEs 14, 16 are each located in coverage of the same cell 12 and where two UEs 24, 30 are located in coverage of different cells 22, 28.

The ProSe Discovery process can be used as a standalone process (i.e. it is not necessarily followed by ProSe Communication) or as an enabler for other services.

Figure 2:
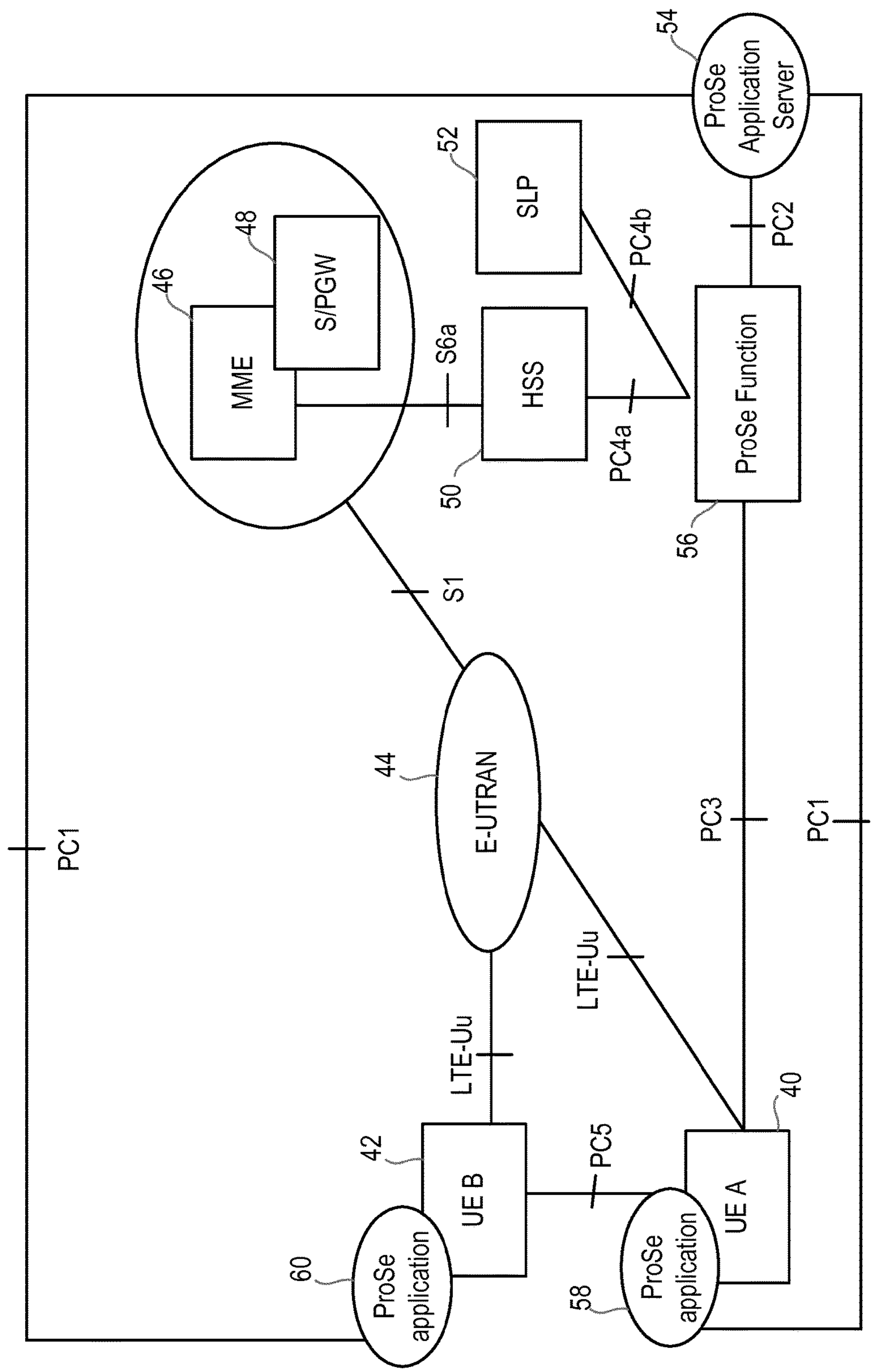
FIG. 2 illustrates another part of the cellular communications network of FIG. 1.

FIG. 2 is an illustration of the ProSe network architecture. In FIG. 2, it is assumed that two user equipment devices, UE A 40 and UE B 42, subscribe to the same Public Land Mobile Network (PLMN).

The two user equipment devices, UE A 40 and UE B 42, each have a respective connection over the LTE-Uu interface to the Evolved UMTS Terrestrial Radio Access Network (E-UTRAN) 44. An S1 interface connects the E-UTRAN to an Evolved Packet Core (EPC) network, which includes a Mobility Management Entity (MME) 46, Serving Gateway (SGW) and Packet Gateway (PGW) 48, Home Subscriber Server (HSS) 50, and Secure User Plane Location (SUPL) Location Platform (SLP) 52, amongst other network nodes.

The network also includes at least one Application server 54, which uses the ProSe capability for building the application functionality.

The core network also includes a ProSe Function 56, which provides functionality such as: Authorization and configuration of the UEs for discovery and direct communication (controlled by the ProSe Function in the user's Home PLMN in the non-roaming case and by the Home PLMN or Visited PLMN ProSe Function in the roaming case); enabling the functionality of the EPC level ProSe discovery; handling and storing of ProSe related new subscriber data and ProSe identities; and security related functionality.

The ProSe Function has a PC3 reference point towards each UE, and has a PC4 reference point towards the EPC.

The ProSe Function also has a PC2 reference point towards at least one ProSe Application Server, which uses the ProSe capability for building the application functionality.

Each UE includes a ProSe application 58, 60, which has a PC1 reference point towards the ProSe Application Server.

The UEs UE A and UE B use the PC5 reference point for control and user plane for discovery and communication, for relay and one-to-one communication (between UEs directly and between UEs over the LTE-Uu interface).

The ProSe Discovery process involves a discovery message being sent by one device, and received by another. The discovery message sent by a device includes an identifier. For example, a discovery message may consist of 8 bits that indicate the message type, 184 bits that make up the ProSe Application Code, and 32 bits that act as a Message Integrity Code.

It is proposed to use location information in the formation of discovery messages, in order to protect against spatial replays.

The location information relates to a location of the terminal device that is sending the discovery message, and includes first location information, defining a region in which the terminal device is located formation and second location information, wherein the first location information relates to a location of the terminal device within a region, and wherein the second location information identifies the region in which the terminal device is located.

In some embodiments, including the embodiment that is described here by way of example, the relevant area, which may be the whole of the earth's surface, or the coverage area of a cellular network for example, is divided into regions, and those regions are subdivided. In the example embodiment described here, these regions are grid squares, and the grid squares are subdivided into smaller squares.

Figure 3:
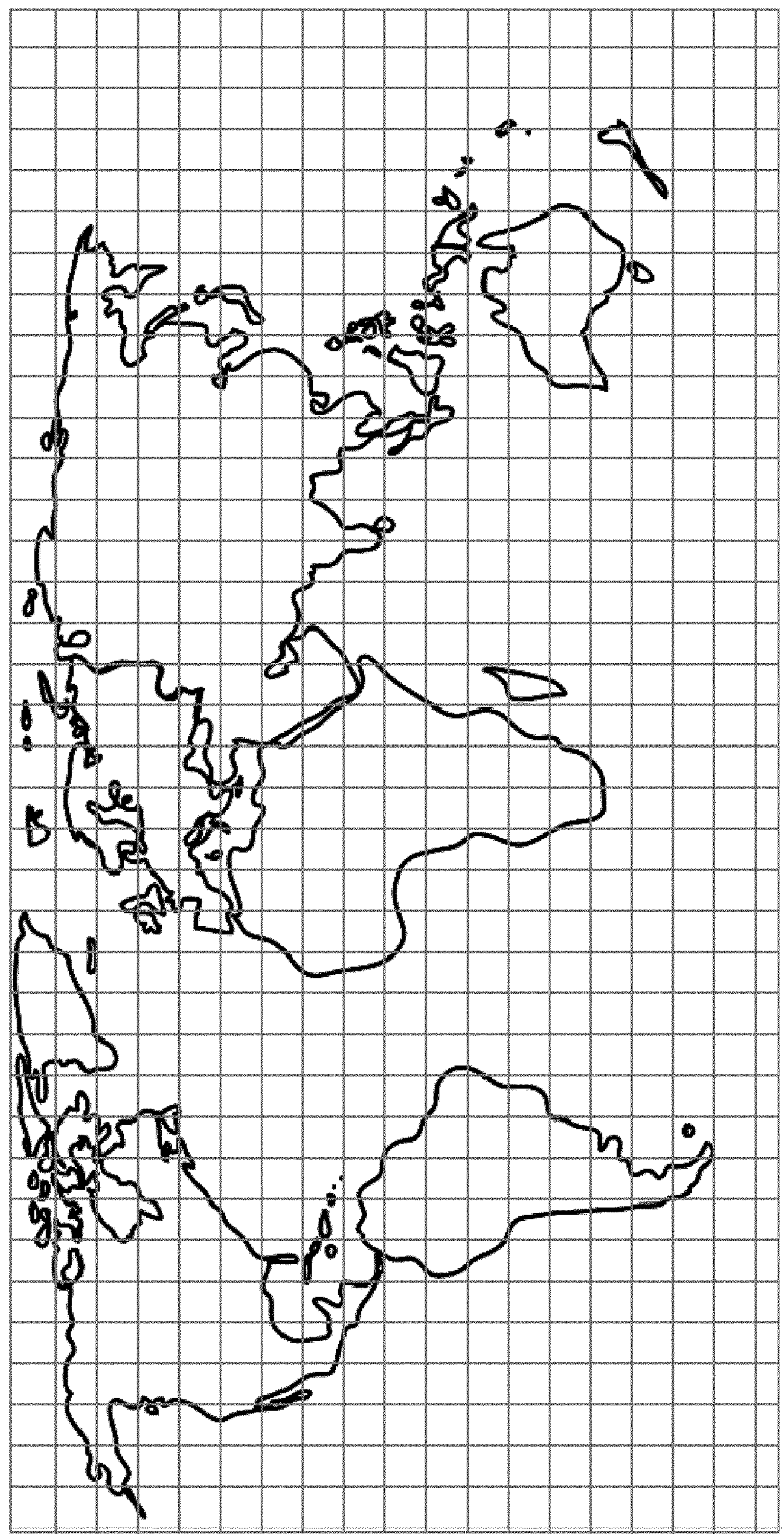
FIG. 3 illustrates a form of location information.

FIG. 3 shows one possible form of the grid that can be used, in the form of the projection of what is known to be the "graticule", that is the grid formed by the latitude and longitude lines. These lines are the basis for the GPS coordinate systems where the reference for the longitude is the prime meridian and for the latitude is the equator.

The grid cells shown in FIG. 3 are of size 5 degrees by 5 degrees. This would correspond to areas whose sizes are of the order of thousands of square kilometers. For the proximity service, in embodiments, a grid based on that shown in FIG. 3, but with a considerably higher resolution could be used. One possibility is to use a grid in which each grid square covers exactly a circle whose diameter is six times the maximal range, r, of the service. For ProSe, this range may for example be about 500 meters.

Regardless of which coordinate system and which projection are used, a universal grid can be defined.

This grid is then used as a reference. Based on its current position, each device can determine which cell it is located in. For that, it is assumed that each big grid cell has a unique public identifier that can be computed, for example using the coordinates of the centre or one of the corners. Furthermore, since the big grid resolution is fixed, a device does not need to be provisioned with the big grid information in advance, but rather can solely rely on its Global Navigation Satellite System (GNSS) such as Global Positioning System (GPS) coordinates to determine the corresponding cell where it is located.

Figure 4:
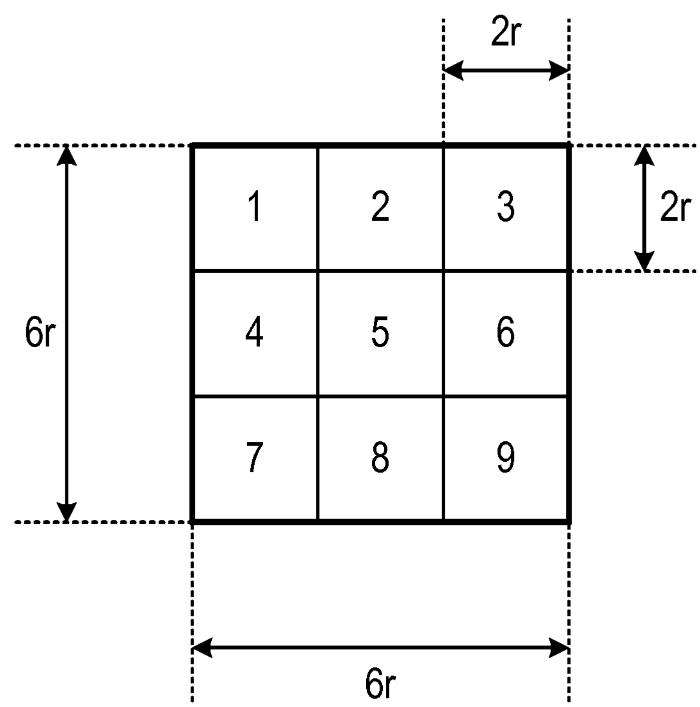
FIG. 4 illustrates a further form of location information.

Each region, that is each cell in the big grid, is then subdivided. For example, as shown in FIG. 4, each square of the big grid may be subdivided into nine equally sized small cells. In this embodiment, a small cell covers a circle with a radius equal to the service range, r, and thus is a square of side 2r. Each small cell is provided with an identifier, indicating its position within the big grid cell. Thus, FIG. 4 shows the nine small cells within one big cell numbered from 1 to 9. It is assumed that the small cells are numbered in the same way within each big grid cell. Thus, the cell numbered 1 is in the same relative position within each big grid cell, and so on.

Thus, using its GPS coordinates, a device can determine the big grid cell within which it is located, and can also determine the small cell, within that big grid cell, within which it is located.

Figure 5:
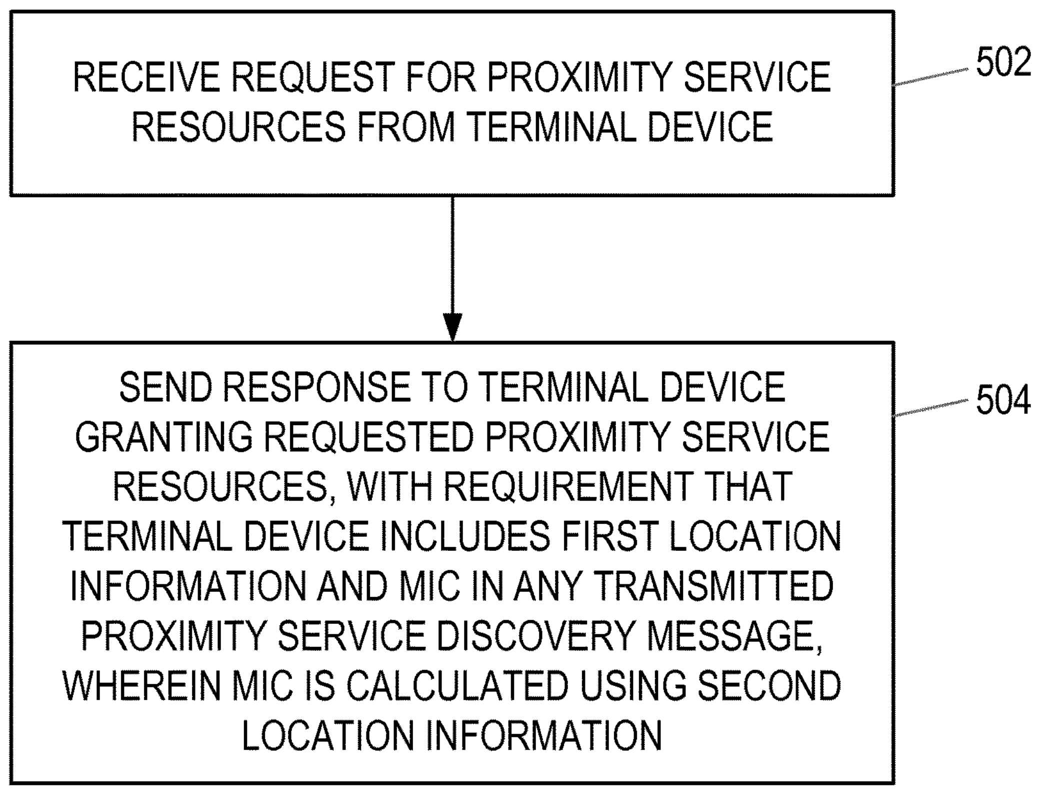
FIG. 5 is a flow chart illustrating a first process.

FIG. 5 is a flow chart, illustrating a process performed in a network node. Specifically, the process may be performed in the ProSe Function node 56 in a core network of a cellular communications network as shown in FIG. 2.

In step 502, the network node receives a request for proximity service resources from a terminal device such as a UE.

In step 504, the network node sends a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

Figure 6:
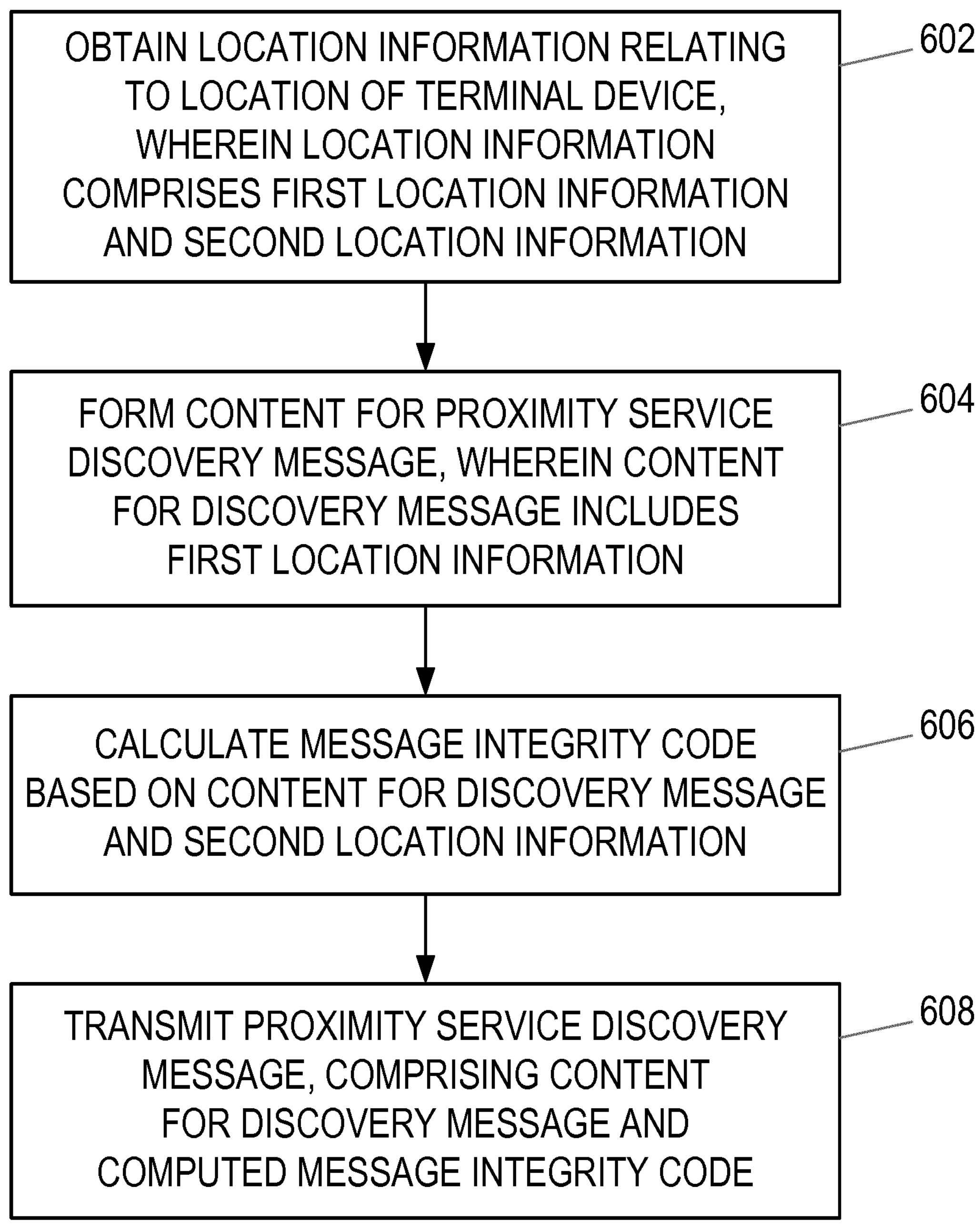
FIG. 6 is a flow chart illustrating a second process.

FIG. 6 is a flow chart, illustrating a process performed in a terminal device or UE that has been granted proximity service resources by a network node such as the ProSe Function node 56 in FIG. 2.

The UE determines that it wishes to send a discovery message over the PC5 reference point as shown in FIG. 2, for detection by at least one other UE.

In step 602, the UE obtains location information relating to its location. For example, the UE can obtain its Global Navigation Satellite System (GNSS) such as Global Positioning System (GPS) coordinates, and use these to derive location information that comprises first location information and second location information. The first location information relates to a location of the terminal device within a region, and the second location information identifies the region in which the terminal device is located.

For example, the second location information may identify a large cell within a grid of cells, and the first location information may identify a small cell within the large cell. The large cell may be a square. The small cell may be a square. In some embodiments, the small cell is a square with a side length approximately equal to twice the range of the proximity service.

Figure 7:
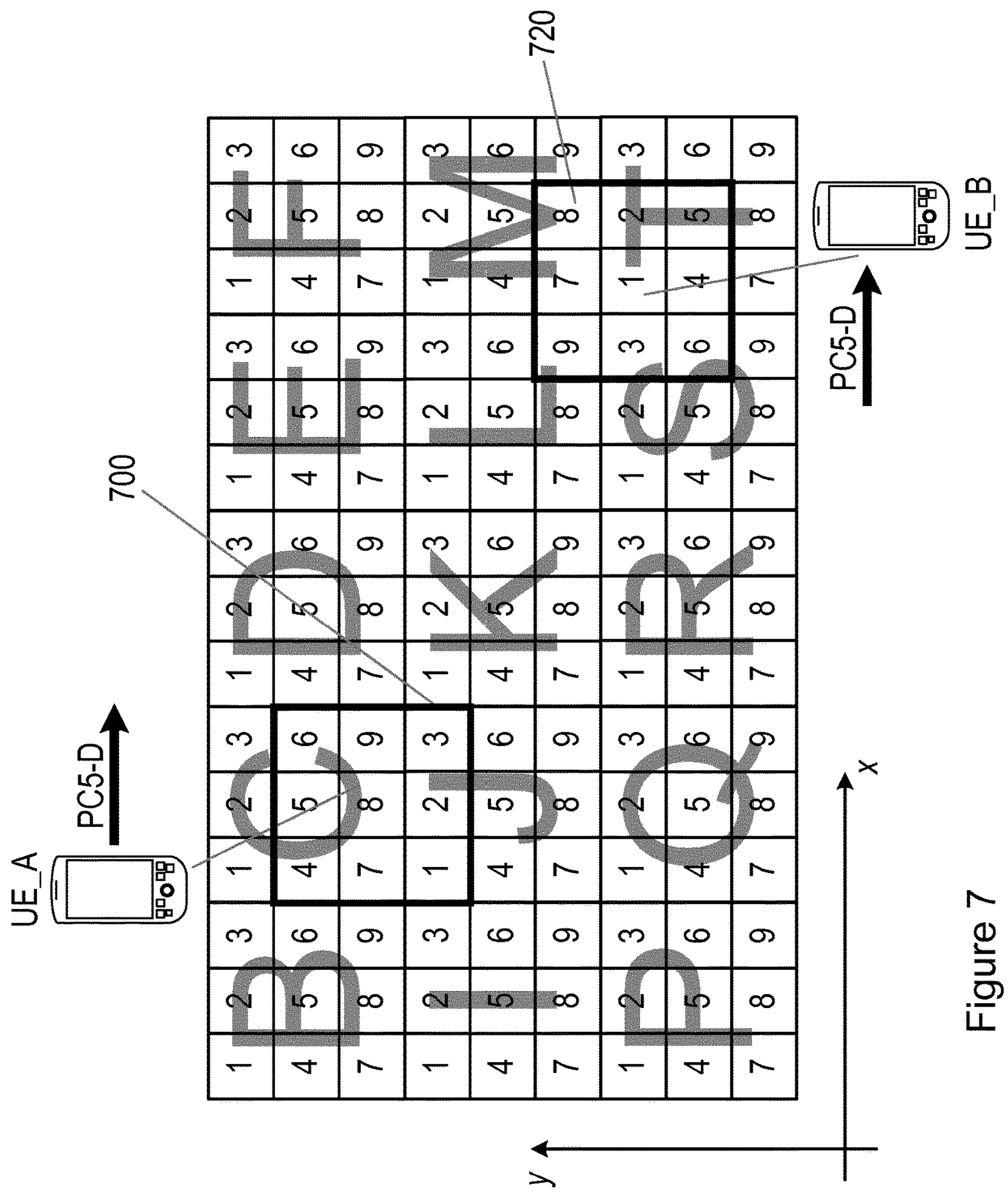
FIG. 7 illustrates a step in the second process.

FIG. 7 illustrates an example of this. In the example shown in FIG. 7, there are big grid cells are identified by letters B, C, D, E, F, I, J, K, L, M, P, Q, R, S, T. Each big grid cell is subdivided into nine small squares, numbered from 1 to 9, with the small square numbered 1 being in the top-left corner of the big cell, and so on, with the small square numbered 9 being in the bottom-right corner of the big cell.

Thus, in the example illustrated in FIG. 7, the UE indicated by UE_A is about to transmit a PC5 discovery message (PC5-D), and is within the small cell numbered 8 within the big cell identified by C. Thus, the first location information obtained by the UE_A indicates the small cell numbered 8 and the second location information obtained by the UE_A indicates the big cell identified by C.

In step 604 of the process shown in FIG. 6, the UE forms the content for the payload of the proximity service discovery message. This content for the discovery message includes the first location information. That is, in the example illustrated in FIG. 7, UE_A includes the first location information indicating that UE_A is within a small cell that is numbered 8 within one of the big cells.

Because of the range of the proximity service transmissions, it can be assumed that the proximity service discovery message, containing the first location information indicating that UE_A is within a small cell that is numbered 8 within one of the big cells, will only be received by a UE that is within that same small cell, or within one of the eight small cells that surround that cell, that is, by a UE that is within the square identified by the reference numeral 700 that is centred on the small cell within which UE_A is located.

Figure 8:
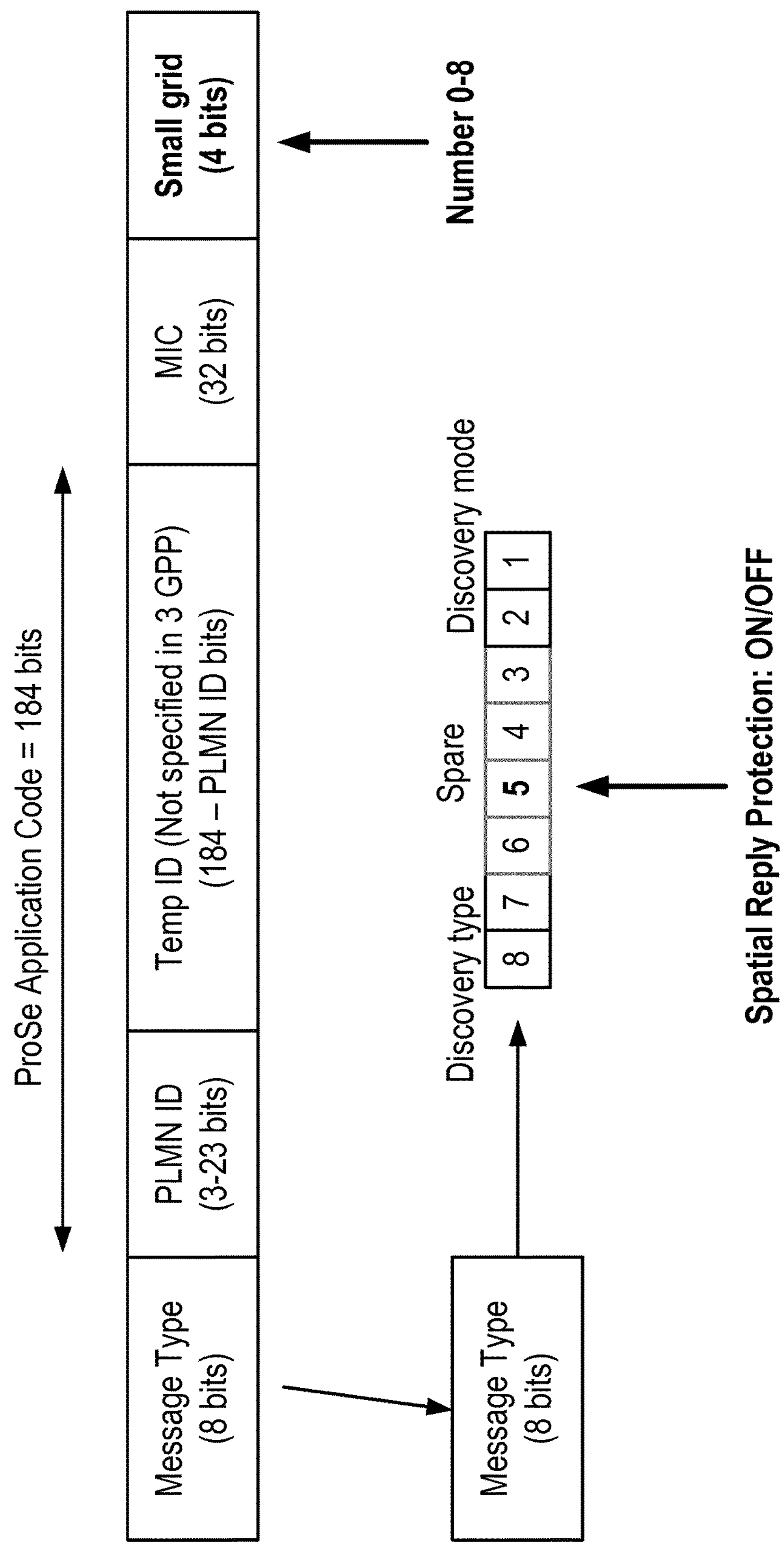
FIG. 8 illustrates a further step in the second process.

FIG. 8 shows one possible form of the proximity service discovery message, or PC5 message. Specifically, FIG. 8 shows that the message may contain: 8 bits that indicate the message type (and that one of these bits may be used to indicate that the spatial replay protection mechanism described herein is being used); a ProSe Application Code of 184 bits (of which 3-23 bits may indicate a Public Land Mobile Network (PLMN) ID, with the remainder being a Temp ID); a Message Integrity Code of 32 bits; and 4 bits that are used to contain the first location information. With nine small grid cells in each large grid cell, it is only necessary to use 4 extra bits in the PC5 message to provide this information. It will be appreciated that this is only an example, and that there are other places in the message where the small grid cell information could be added, e.g. it could be part of the Prose Application Code if one UE was allowed to use 9 values of the 4 bits for itself.

In step 606 of the process shown in FIG. 6, the UE computes the message integrity code that is to be included in the discovery message. Specifically, the UE computes the message integrity code using the payload content formed in step 604, and also using the second location information, that is the identity of the large grid cell in which the device is located.

In step 608, the UE forms the complete message content, using the payload, the message integrity code, and any other information. Then the UE encodes and transmits the proximity service discovery message formed in this way.

The proximity service discovery message may for example be a proximity service discovery request message, or a proximity service discovery response message.

Figure 9:
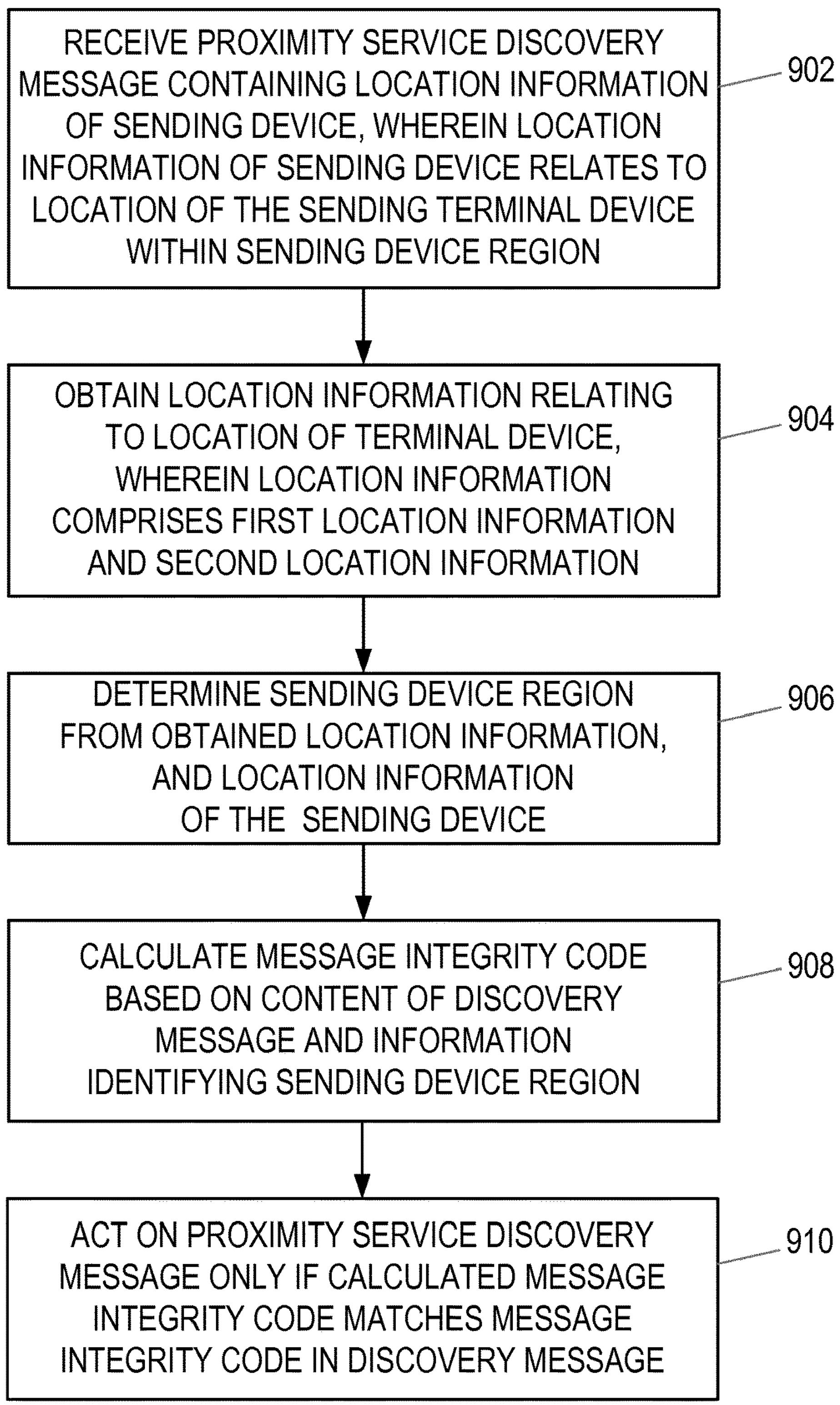
FIG. 9 is a flow chart illustrating a third process.

FIG. 9 is a flow chart, illustrating a process performed in a terminal device or UE that receives a discovery message. As described below, the UE now has the means to check that the sender is indeed in proximity.

In step 902, the UE receives a proximity service discovery message containing location information. On receipt, the UE receives and decodes the message. As discussed above with reference to FIG. 6, this discovery message contains location information of the sending device, specifically relating to a location of the sending terminal device within a sending device region.

The proximity service discovery message may for example be a proximity service discovery request message, or a proximity service discovery response message.

In step 904, the UE obtains location information relating to its own location. Specifically, the obtains its Global Navigation Satellite System (GNSS) such as Global Positioning System (GPS) coordinates, and uses this to derive location information, specifically first location information and second location information, wherein the first location information relates to a location of the terminal device within a region (for example a small cell within a big cell), and wherein the second location information identifies the region (for example the big cell) in which the terminal device is located.

In some embodiments, the large cell is a square, and the small cell is a square. The small cell may be a square with a side length approximately equal to twice the range of the proximity service.

Thus, in the second example illustrated in FIG. 7, the UE indicated by UE_B is within the small cell numbered 1 within the big cell identified by T. Thus, the location information obtained by the UE_B indicates the small cell numbered 1 and the big cell identified by T.

In step 906, the UE determines in which of the neighbouring big grid cells the message originated. This is achieved using the location information obtained in step 904 and the location information of the sending device included in the discovery message.

Specifically, in this illustrated example, the discovery message will contain location information identifying the small cell within which the sending device was located, but not identifying the big cell within which the sending device was located.

However, because the UE indicated by UE_B is within the small cell numbered 1 within the big cell identified by T, it can assume that the sending device is within that same small cell, or within one of the eight cells surrounding it, namely within the square indicated by the reference numeral 720 in FIG. 7.

The square 720 contains nine small cells, of which only one is numbered 1, only one is numbered 2, and so on. This allows the UE_B to deduce the big cell in which the sending device was located.

Specifically:

if the discovery message contains first location information identifying a small cell numbered 1, 2, 4 or 5, the UE_B can deduce that the sending device was located in the big cell T;

if the discovery message contains first location information identifying a small cell numbered 3 or 6, the UE_B can deduce that the sending device was located in the big cell S;

if the discovery message contains first location information identifying a small cell numbered 7 or 8, the UE_B can deduce that the sending device was located in the big cell M; and if the discovery message contains first location information identifying a small cell numbered 9, the UE_B can deduce that the sending device was located in the big cell L.

In step 908, the UE calculates a message integrity code based on the content of the received discovery message and based on the information identifying the sending device region, namely the identification of the big grid cell determined in step 906.

This calculated message integrity code is then compared with the message integrity code included in the discovery message. A match can only be obtained if the sender did in fact use that big grid cell as its second location information when calculating the message integrity code for inclusion in the discovery message, and so the receiving UE can use a match to determine that the sending UE was indeed in the cell identified in that step.

Thus, in step 910, the UE can determine that it should act on the proximity service discovery message only if the calculated message integrity code matches the message integrity code in the discovery message.

Thus, it can be seen that any square formed by 9 small grid cells always contains small cells numbered from 1 to 9, although possibly arranged in a different manner from that shown in FIG. 4. As a consequence, at the receiving side, any small grid cell number included in the message can always be mapped to a unique big cell among the neighbouring ones including the big grid cell where the receiver is located.

The method was described above by way of an example, in which each region, or big grid cell, was divided into a 3×3 grid of small grid cells, although it will be appreciated that any subdivision is possible, such as subdivision into a 4×4 grid. If the size of the small cells is kept as a 2r×2r square, this would mean that the size of the big grid cells would for example be 8r×8r in the case of a 4×4 grid.

In illustrated embodiments, the small grid cells are obtained by dividing the big grid cells into equally sized squares. However, other subdivisions are possible.

The big grid cell can be calculated from the binary representation of GPS co-ordinates by using a binary mask (and binary operations) from the location of the UE. The binary mask would need to be identical for all users trying to discover each other within a group. Different groups could use different binary masks.

Figure 10:
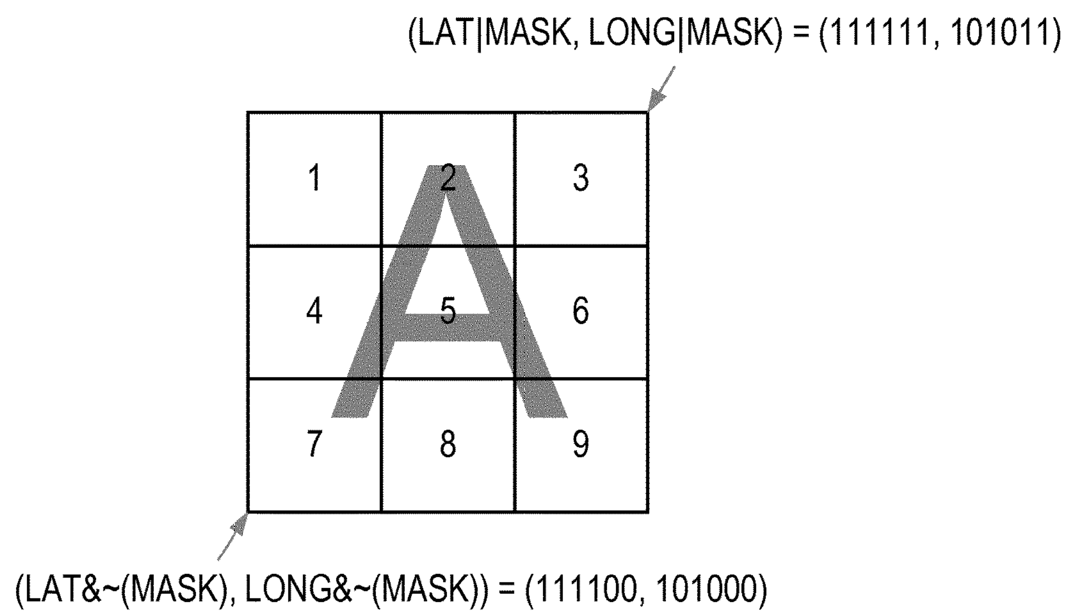
FIG. 10 illustrates a step in the third process.

As an illustrative example, if a UE location was (LAT: 111101, LONG: 101010) and the binary mask value, MASK, was 000011, the UE could calculate the big grid cell as shown in FIG. 10. Specifically, the co-ordinates of the lower left corner of the grid cell are given by (LAT&~(MASK), LONG&~(MASK)) and the co-ordinates of the upper right corner of the grid cell are given by the (LAT|MASK, LONG|MASK), where |=binary OR, &=binary AND, ~=binary NOT. Thus, the lower left corner of the grid cell is identified by the co-ordinates (111100, 101000) and the upper right corner of the grid cell is identified by the co-ordinates (111111, 101011).

Figure 11:
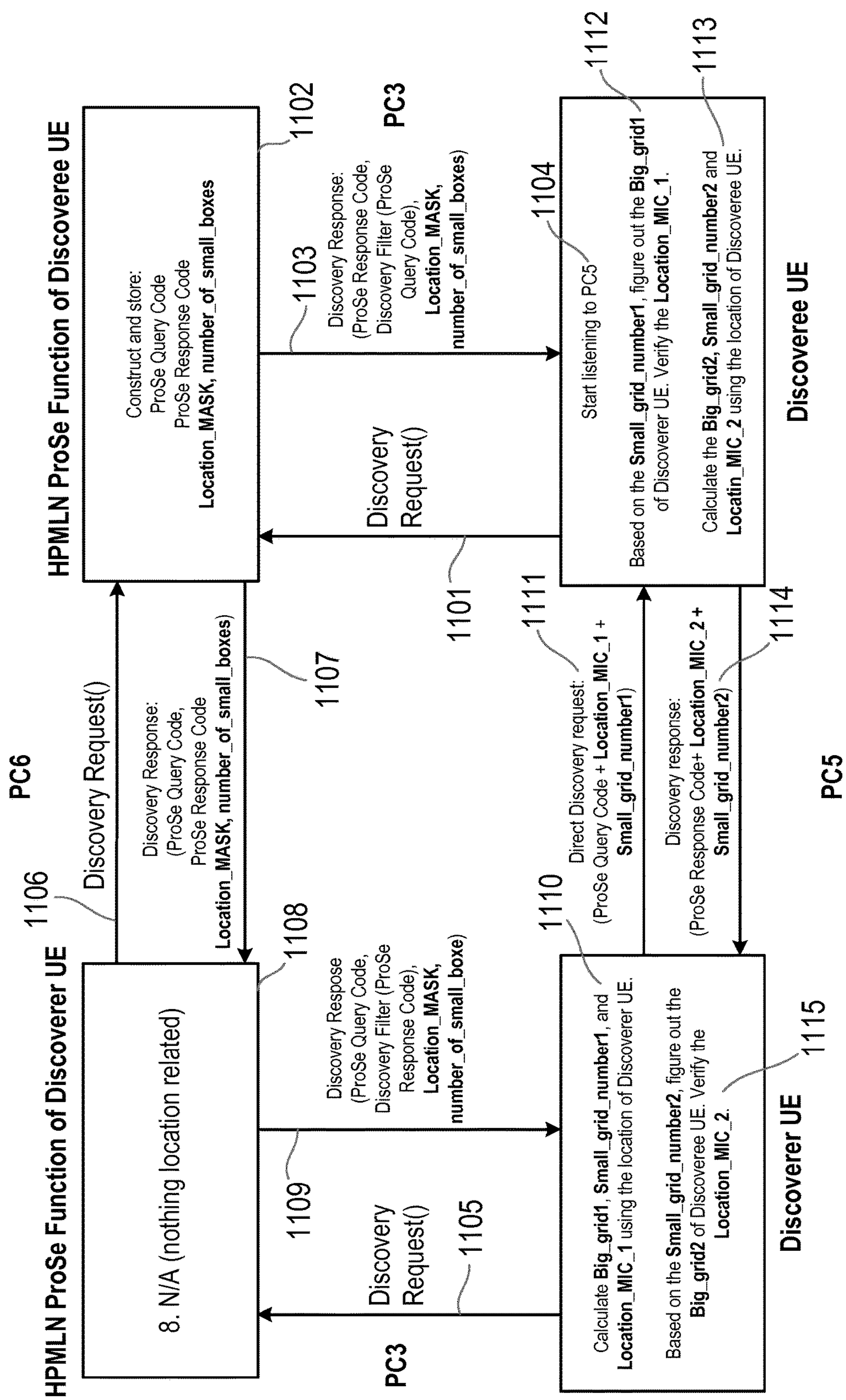
FIG. 11 is a signalling diagram illustrating a fourth process.

The grid calculation binary mask value MASK could be distributed by the ProSe Function. FIG. 11 demonstrates this for the case of the ProSe Restricted Discovery Model B in a mode where the MIC verification is done by the Discoverer UE. If the MIC calculation is done in the ProSe Function instead, additional necessary information could be included in the Match Report message sent by the Discoverer UE. Note that a similar procedure with necessary adjustments could be used with Model A discovery, and with Open discovery.

First the Discoveree UE prepares itself for the Direct Discovery by performing the Discovery Request procedure. Thus, in step 1101, the Discoveree UE sends a Discovery Request. In this request, the Discoveree UE may indicate if it is using a privacy sensitive or DoS attack sensitive application.

In step 1102, the ProSe Function constructs and stores the Query Code, and related encryption key (A), and the Response Code, and related encryption key (B). It also decides the value of Location_MASK, and the number of small cells in each large grid cell.

In step 1103, the constructed codes, related encryption keys, the value of Location_MASK, and the number of small cells in each large grid cell are returned to the Discoveree UE in the Discovery Response.

In step 1104, the Discoveree UE starts listening on the PC5 interface.

The Discoverer UE also prepares itself for the Direct Discovery by performing the Discovery Request procedure. In step 1105, the Discoverer UE sends a Discovery Request.

In step 1106, the ProSe Function sends the Discovery Request to the ProSe Function of the Discoveree UE.

In step 1107, the ProSe Function of the Discoveree UE returns the Discovery Response including the Query Code and Response Code with related encryption keys, the value of Location_MASK, and the number of small cells in each large grid cell.

In step 1108, the ProSe Function proceeds with Discovery Request procedure. This phase does not include anything new to existing procedures.

In step 1109, the ProSe codes, related encryption keys, the value of Location_MASK, and the number of small cells in each large grid cell are returned to the Discoverer UE in the Discovery Response.

In step 1110, the Discoverer UE obtains its location information, relating to a location of the terminal device, the location information comprising first location information and second location information, wherein the first location information (Small_grid_number1) relates to a location of the terminal device within a region (e.g. a small grid cell within a large grid cell), and wherein the second location information (Big_grid1) identifies the region (e.g. a large grid cell) in which the terminal device is located. Having formed the content for a proximity service discovery message, the Discoverer UE also calculates a message integrity code (Location_MIC_1) based on the content for the discovery message and the second location information.

In the next phase, the Discoverer UE starts discovering the Discoveree UE. Thus, in step 1111, the Discoverer UE sends the Direct Discovery request, including the ProSe Query Code, the first location information (Small_grid_number1), and the message integrity code (Location_MIC_1).

In step 1112, the Discoveree UE detects the PC5 message, and then, as described above, determines the big grid cell from which the message was sent, and attempts to verify the received message integrity code (Location_MIC_1).

Assuming that the received message integrity code is verified, then, in step 1113, the Discoveree UE obtains its location information, relating to a location of the terminal device, the location information comprising first location information and second location information, wherein the first location information (Small_grid_number2) relates to a location of the terminal device within a region (e.g. a small grid cell within a large grid cell), and wherein the second location information (Big_grid2) identifies the region (e.g. a large grid cell) in which the terminal device is located. Having formed the content for a proximity service discovery message, the Discoveree UE also calculates a message integrity code (Location_MIC_2) based on the content for the discovery message and the second location information.

In step 1114, the Discoveree UE sends the Discovery response, including the ProSe Response Code, the first location information (Small_grid_number2), and the message integrity code (Location_MIC_2).

In step 1115, the Discovere5 UE detects the Discovery response message, and then, as described above, determines the big grid cell from which the message was sent, and attempts to verify the received message integrity code (Location_MIC_2).

Figure 12:
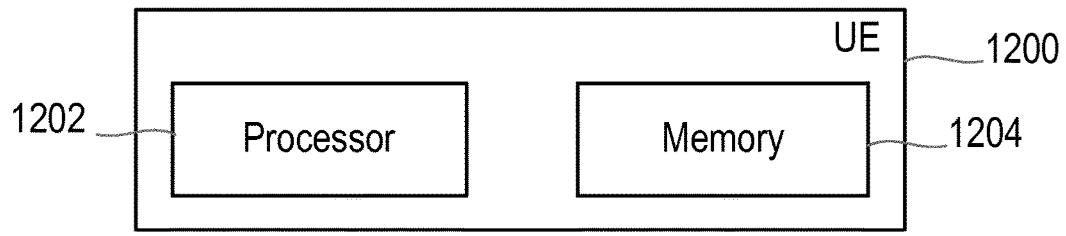
FIG. 12 illustrates a terminal device in the network of FIG. 1.

FIG. 12 shows a terminal device (UE) 1200 that can be adapted or configured to operate according to one or more of the non-limiting example embodiments described. The UE 1200 comprises a processor or processing unit 1202 that controls the operation of the UE 1200. The UE 1200 also comprises a memory or memory unit 1204 that is connected to the processing unit 1202 and that contains instructions or computer code executable by the processing unit 1202 and other information or data required for the operation of the UE 1200 in accordance with the methods described herein. The terminal device is also referred to herein as a mobile station (MS).

Figure 13:
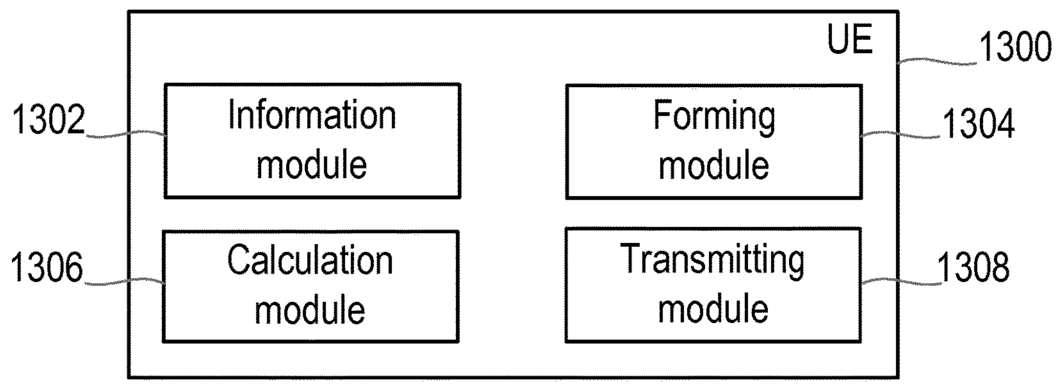
FIG. 13 illustrates a terminal device in the network of FIG. 1.
Figure 14:
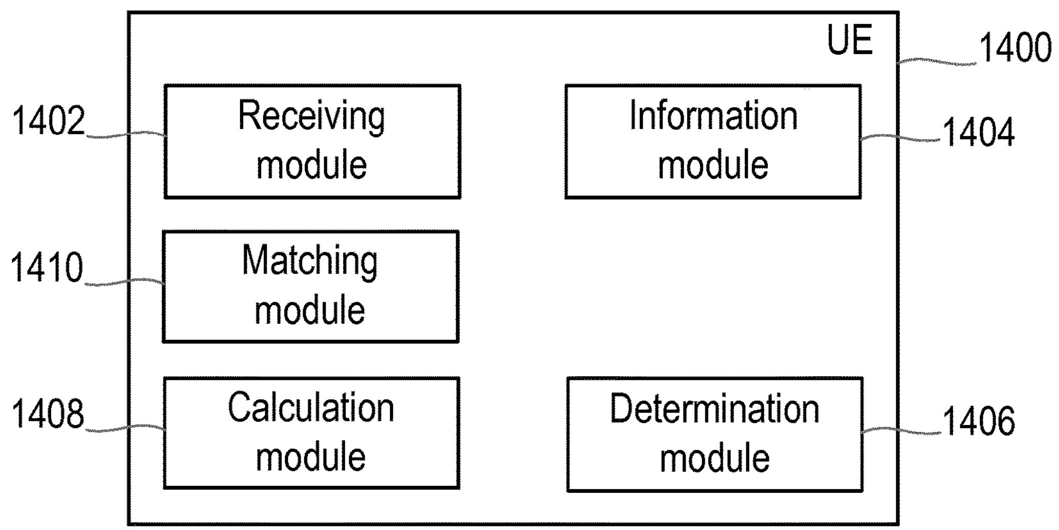
FIG. 14 illustrates a terminal device in the network of FIG. 1.
Figure 15:
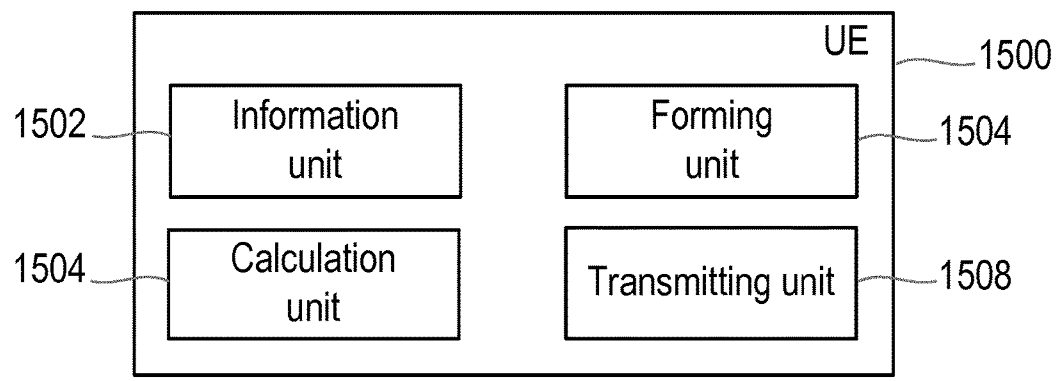
FIG. 15 illustrates a terminal device in the network of FIG. 1.
Figure 16:
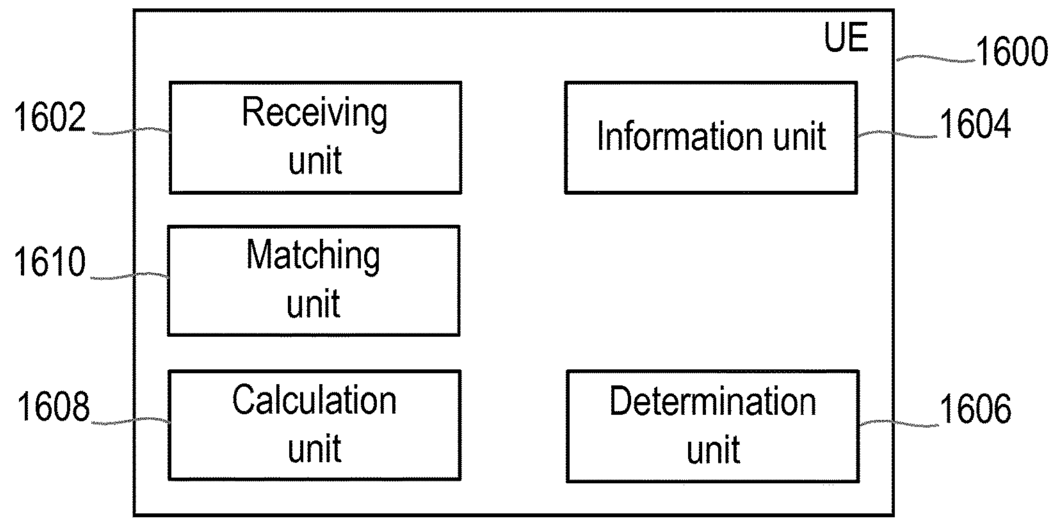
FIG. 16 illustrates a terminal device in the network of FIG. 1.

FIGS. 13, 14, 15 and 16 illustrate functional units in other embodiments of devices 1300, 1400, 1500 and 1600 which may execute any of the methods described herein, for example according to computer readable instructions received from a computer program. It will be understood that the modules illustrated in FIGS. 13 and 14 are software implemented functional units, and may be realised in any appropriate combination of software modules. It will be understood that the units illustrated in FIGS. 15 and 16 are hardware implemented functional units, and may be realised in any appropriate combination of hardware units.

FIG. 13 illustrates a terminal device (UE) 1300 according to embodiments. The terminal device 1300 comprises an information module 1302 for obtaining location information relating to a location of the terminal device, wherein the location information comprises first location information and second location information, wherein the first location information relates to a location of the terminal device within a region, and wherein the second location information identifies the region in which the terminal device is located. The terminal device 1300 also comprises a forming module 1304, for forming content for a proximity service discovery message, wherein the content for the discovery message includes the first location information. The terminal device 1300 also comprises a calculating module 1304 for calculating a message integrity code based on the content for the discovery message and the second location information; and a transmission module 1306 for transmitting the proximity service discovery message, comprising the content for the discovery message and the computed message integrity code.

FIG. 14 illustrates a terminal device (UE) 1400 according to embodiments. The terminal device 1400 comprises a receiving module 1402 for receiving a proximity service discovery message containing location information of a sending device, wherein the location information of the sending device relates to a location of the sending terminal device within a sending device region. The terminal device 1400 also includes an information module 1404 for obtaining location information relating to a location of the terminal device, wherein the location information comprises first location information and second location information, wherein the first location information relates to a location of the terminal device within a region, and wherein the second location information identifies the region in which the terminal device is located. The terminal device 1400 also includes a determination module 1406 for determining the sending device region from the obtained location information, and the location information of the sending device. The terminal device 1400 also comprises a calculation module 1408 for calculating a message integrity code based on content of the discovery message and information identifying the sending device region; and a matching module 1410 for acting on the proximity service discovery message only if the calculated message integrity code matches a message integrity code in the discovery message.

FIG. 15 illustrates a terminal device (UE) 1500 according to embodiments. The terminal device 1500 comprises an information unit 1502 for obtaining location information relating to a location of the terminal device, wherein the location information comprises first location information and second location information, wherein the first location information relates to a location of the terminal device within a region, and wherein the second location information identifies the region in which the terminal device is located. The terminal device 1500 also comprises a forming unit 1504, for forming content for a proximity service discovery message, wherein the content for the discovery message includes the first location information. The terminal device 1500 also comprises a calculating unit 1504 for calculating a message integrity code based on the content for the discovery message and the second location information; and a transmission unit 1506 for transmitting the proximity service discovery message, comprising the content for the discovery message and the computed message integrity code.

FIG. 16 illustrates a terminal device (UE) 1600 according to embodiments. The terminal device 1600 comprises a receiving unit 1602 for receiving a proximity service discovery message containing location information of a sending device, wherein the location information of the sending device relates to a location of the sending terminal device within a sending device region. The terminal device 1600 also includes an information unit 1604 for obtaining location information relating to a location of the terminal device, wherein the location information comprises first location information and second location information, wherein the first location information relates to a location of the terminal device within a region, and wherein the second location information identifies the region in which the terminal device is located. The terminal device 1600 also includes a determination unit 1606 for determining the sending device region from the obtained location information, and the location information of the sending device. The terminal device 1600 also comprises a calculation unit 1608 for calculating a message integrity code based on content of the discovery message and information identifying the sending device region; and a matching unit 1610 for acting on the proximity service discovery message only if the calculated message integrity code matches a message integrity code in the discovery message.

Figure 17:
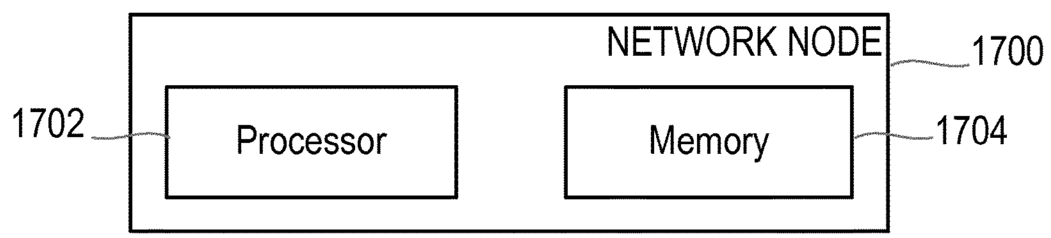
FIG. 17 illustrates a network node in the network of FIG. 1.

FIG. 17 shows a network node 1700 that can be adapted or configured to operate according to one or more of the non-limiting example embodiments described. The network node 1700 comprises a processor or processing unit 1702 that controls the operation of the network node 1700. The network node 1700 also comprises a memory or memory unit 1704 that is connected to the processing unit 1702 and that contains instructions or computer code executable by the processing unit 1702 and other information or data required for the operation of the UE 1700 in accordance with the methods described herein.

Figure 18:
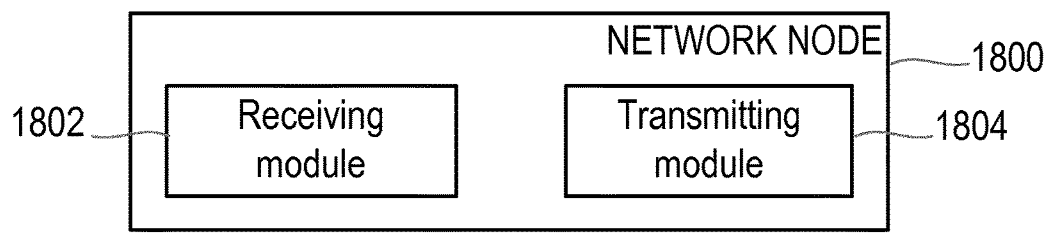
FIG. 18 illustrates a network node in the network of FIG. 1.
Figure 19:
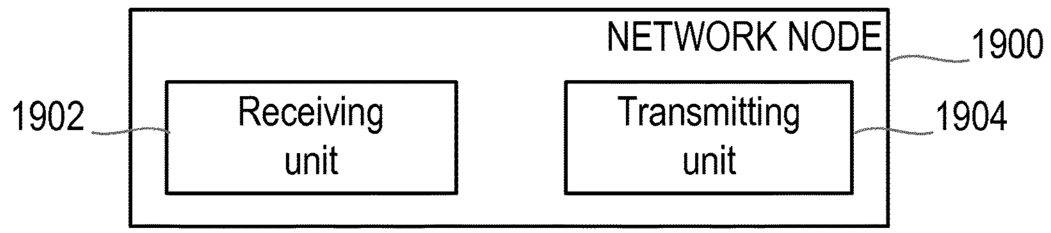
FIG. 19 illustrates a network node in the network of FIG. 1.

FIGS. 18 and 19 illustrate functional units in other embodiments of devices or nodes 1800 and 1900 which may execute any of the methods described herein, for example according to computer readable instructions received from a computer program. It will be understood that the modules illustrated in FIG. 18 are software implemented functional units, and may be realised in any appropriate combination of software modules. It will be understood that the units illustrated in FIG. 19 are hardware implemented functional units, and may be realised in any appropriate combination of hardware units.

FIG. 18 illustrates a network node 1800 according to embodiments. The network node 1400 comprises a receiving module 1802 for receiving a request for proximity service resources from a terminal device; and a transmitting module 1804 for sending a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

FIG. 19 illustrates a network node 1900 according to embodiments. The network node 1900 comprises a receiving unit 1902 for receiving a request for proximity service resources from a terminal device; and a transmitting unit 1904 for sending a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a terminal device, the method comprising:

obtaining location information relating to a location of the terminal device, wherein the location information comprises first location information and second location information, wherein the first location information relates to a location of the terminal device within a region, and wherein the second location information identifies the region in which the terminal device is located;

forming content for a proximity service discovery message, wherein the content for the discovery message includes the first location information;

calculating a message integrity code based on the content for the discovery message and the second location information; and transmitting the proximity service discovery message, comprising the content for the discovery message and the computed message integrity code.

2. The method of claim 1, wherein the second location information identifies a large cell, and wherein the first location information identifies a small cell within the large cell.

3. The method of claim 2, wherein the large cell is a square.

4. The method of claim 2, wherein the small cell is a square.

5. The method of claim 4, wherein the small cell is a square with a side length approximately equal to twice the range of the proximity service.

6. The method of claim 1, wherein the proximity service discovery message is a proximity service discovery request message or a proximity service discovery response message.

7. A terminal device for use in a communications network, the terminal device comprising:

processing circuitry;

memory containing instructions executable by the processing circuitry whereby the terminal device is operative to:

obtain location information relating to a location of the terminal device, wherein the location information comprises first location information and second location information, wherein the first location information relates to a location of the terminal device within a region, and wherein the second location information identifies the region in which the terminal device is located;

form content for a proximity service discovery message, wherein the content for the discovery message includes the first location information;

calculate a message integrity code based on the content for the discovery message and the second location information; and transmit the proximity service discovery message, comprising the content for the discovery message and the computed message integrity code.

8. The terminal device of claim 7, wherein the second location information identifies a large cell, and wherein the first location information identifies a small cell within the large cell.

9. The terminal device of claim 8, wherein the large cell is a square.

10. The terminal device of claim 8, wherein the small cell is a square.

11. The terminal device of claim 10, wherein the small cell is a square with a side length approximately equal to twice the range of the proximity service.

12. The terminal device of claim 7, wherein the proximity service discovery message is a proximity service discovery request message or a proximity service discovery response message.

13. A method of operation of a terminal device, the method comprising:

receiving a proximity service discovery message containing location information of a sending device, wherein the location information of the sending device relates to a location of the sending terminal device within a sending device region;

obtaining location information relating to a location of the terminal device, wherein the location information comprises first location information and second location information, wherein the first location information relates to a location of the terminal device within a region, and wherein the second location information identifies the region in which the terminal device is located;

determining the sending device region from the obtained location information and the location information of the sending device;

calculating a message integrity code based on content of the discovery message and information identifying the sending device region; and acting on the proximity service discovery message only if the calculated message integrity code matches a message integrity code in the discovery message.

14. The method of claim 13, wherein the second location information identifies a large cell, and wherein the first location information identifies a small cell within the large cell.

15. The method of claim 14, wherein the large cell is a square.

16. The method of claim 14, wherein the small cell is a square.

17. The method of claim 16, wherein the small cell is a square with a side length approximately equal to twice the range of the proximity service.

18. The method of claim 13, wherein the proximity service discovery message is a proximity service discovery request message or a proximity service discovery response message.

19. A terminal device for use in a communications network, the terminal device comprising:

processing circuitry;

memory containing instructions executable by the processing circuitry whereby the terminal device is operative to:

receive a proximity service discovery message containing location information of a sending device, wherein the location information of the sending device relates to a location of the sending terminal device within a sending device region;

obtain location information relating to a location of the terminal device, wherein the location information comprises first location information and second location information, wherein the first location information relates to a location of the terminal device within a region, and wherein the second location information identifies the region in which the terminal device is located;

determine the sending device region from the obtained location information and the location information of the sending device;

calculate a message integrity code based on content of the discovery message and information identifying the sending device region; and act on the proximity service discovery message only if the calculated message integrity code matches a message integrity code in the discovery message.

20. The terminal device of claim 19, wherein the second location information identifies a large cell, and wherein the first location information identifies a small cell within the large cell.

21. The terminal device of claim 20, wherein the large cell is a square.

22. The terminal device of claim 20, wherein the small cell is a square.

23. The terminal device of claim 22, wherein the small cell is a square with a side length approximately equal to twice the range of the proximity service.

24. The terminal device of claim 19, wherein the proximity service discovery message is a proximity service discovery request message or a proximity service discovery response message.

25. A method of operation of a network node, the method comprising:

receiving a request for proximity service resources from a terminal device such as a UE; and sending a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

26. A network node for use in a communications network, the network node comprising:

processing circuitry;

memory containing instructions executable by the processing circuitry whereby the network node is operative to:

receive a request for proximity service resources from a terminal device such as a UE; and send a response to the terminal device granting the requested proximity service resources, with a requirement that the terminal device includes in its proximity service discovery messages first location information and a message integrity code, wherein the first location information relates to a location of the terminal device within a region, wherein the message integrity code is calculated using second location information, and wherein the second location information identifies the region in which the terminal device is located.

* * * * *